United States Patent
Brunet et al.

(10) Patent No.: US 11,754,068 B1
(45) Date of Patent: Sep. 12, 2023

(54) PACKING SLEEVE FOR PUMP FLUID END

(71) Applicant: Halliburton Energy Services, Inc., Houston, TX (US)

(72) Inventors: John Dexter Brunet, Duncan, TX (US); Justin Lee Hurst, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/949,471

(22) Filed: Sep. 21, 2022

(51) Int. Cl.
| | |
|---|---|
| *F04B 53/02* | (2006.01) |
| *F04B 53/14* | (2006.01) |
| *F04B 53/22* | (2006.01) |
| *F04B 53/16* | (2006.01) |
| *F04B 39/12* | (2006.01) |
| *F16J 10/04* | (2006.01) |
| *E21B 43/26* | (2006.01) |

(52) U.S. Cl.
CPC .......... *F04B 53/02* (2013.01); *E21B 43/2607* (2020.05); *F04B 39/126* (2013.01); *F04B 53/14* (2013.01); *F04B 53/164* (2013.01); *F04B 53/166* (2013.01); *F04B 53/22* (2013.01); *F16J 10/04* (2013.01); *F04B 53/168* (2013.01)

(58) Field of Classification Search
CPC ...... F04B 39/126; F04B 53/02; F04B 53/166; F04B 53/168; F04B 53/22; F04B 53/164; F16J 10/04
See application file for complete search history.

(56) References Cited

U.S. PATENT DOCUMENTS

| | | | | |
|---|---|---|---|---|
| 11,421,680 | B1* | 8/2022 | Smith | F04B 53/14 |
| 2003/0227139 | A1* | 12/2003 | Antoun | F16J 15/186 |
| | | | | 277/467 |
| 2020/0182240 | A1* | 6/2020 | Nowell | F04B 1/0404 |
| 2020/0232456 | A1* | 7/2020 | Plantard | B05B 9/0413 |
| 2020/0362971 | A1* | 11/2020 | Hurst | F04B 53/02 |
| 2021/0108734 | A1* | 4/2021 | Nowell | F16K 5/0471 |
| 2022/0260161 | A1* | 8/2022 | Nowell | F16K 5/0271 |
| 2022/0282685 | A1* | 9/2022 | Kumareshan | F16J 10/04 |

FOREIGN PATENT DOCUMENTS

DE     102007020300 A1 * 10/2008  .............. F04B 1/122

OTHER PUBLICATIONS

DE102007020300A1_t machine translation thereof (Year: 2008).*

* cited by examiner

*Primary Examiner* — Kenneth Bomberg
*Assistant Examiner* — Matthew Wiblin
(74) *Attorney, Agent, or Firm* — Conley Rose, P.C.; Rodney B. Carroll

(57) ABSTRACT

A packing sleeve for a pump fluid end. The packing sleeve comprising a tubular body having a first end, a second end, and a total axial length along a center axis extending from the first end to the second end; the tubular body further comprises a first region that is adjacent to the first end, wherein the first region extends away from the first end a first axial distance and a second region that is adjacent to the second end, wherein the second region extends away from the second end a second axial distance and abuts the first region, wherein the first axial distance and the second axial distance equal the total axial length and wherein the first axial distance comprises about 35-70% of the total axial length.

20 Claims, 8 Drawing Sheets

US 11,754,068 B1

PACKING SLEEVE FOR PUMP FLUID END

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to a method and apparatus for enhancing durability and ease of repair of equipment that supplies pressurized fluids. More particularly, the present disclosure relates to methods and devices for prolonging the working life of seals on reciprocating devices for pumping fluids into a wellbore.

BACKGROUND

High-pressure pumps having reciprocating elements such as plungers or pistons are commonly employed in oil and gas production fields for operations such as drilling and well-servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, seals and other pump components are susceptible to wear and may be replaced during servicing and maintenance of the pump. It is advantageous to minimize the replacement process by minimizing the pump components' susceptibility to wear under the harsh conditions. Access to the seals and other pump components is made possible by removing a packing screw from the fluid end. One or more seals may be replaced on location. Seals may be replaced during a scheduled maintenance at a servicing location.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
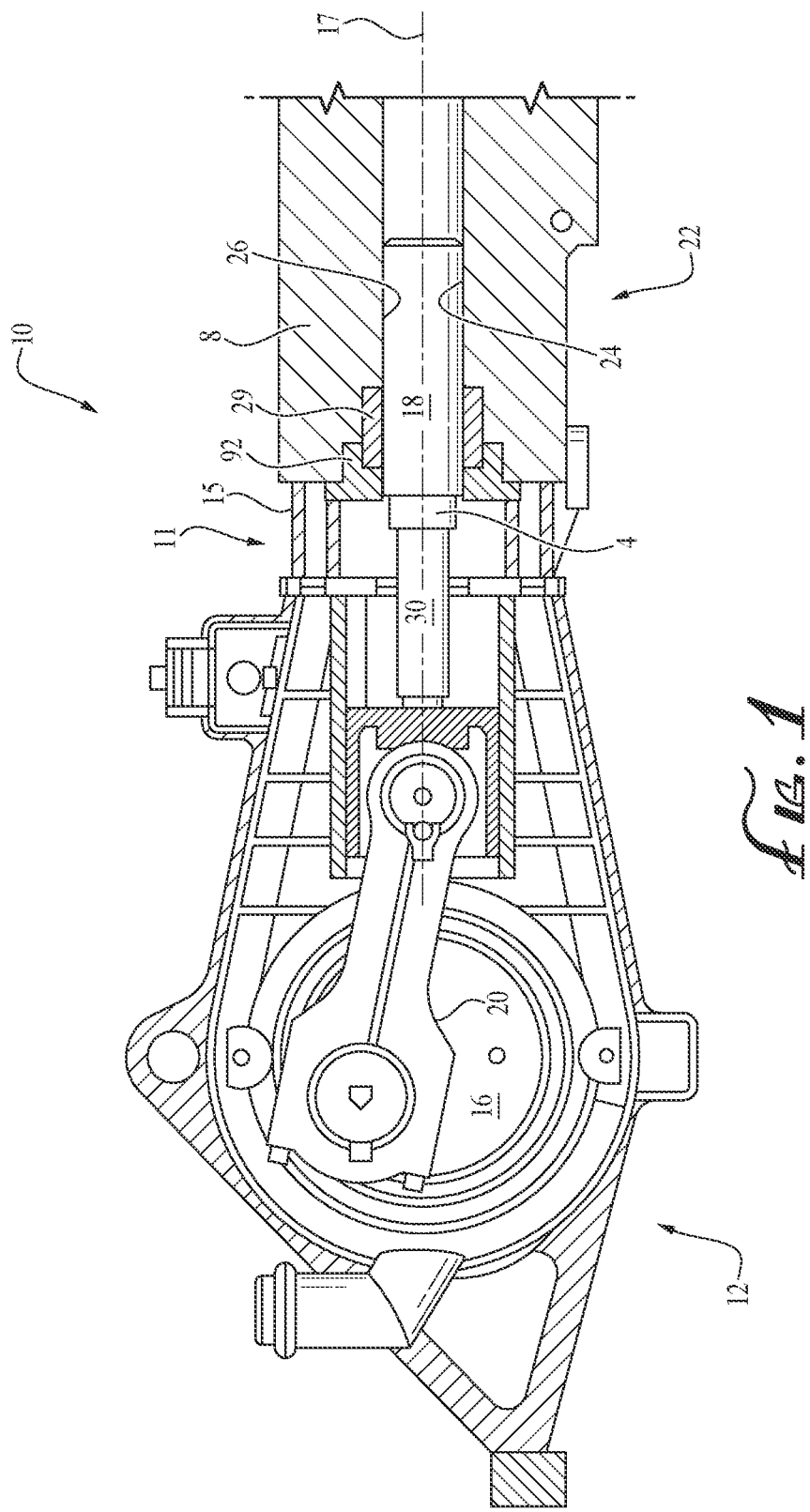
FIG. 1 is cut-away illustration of a pump power end of a pump, according to embodiments of the present disclosure.

It should be understood at the outset that although an illustrative implementation of one or more embodiments is provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Oilfield pumps typically operate outside in adverse weather conditions pumping a variety of fluids at high pressures and high flow rates to perform oilfield and/or well-servicing operations. Oilfield pumps may encounter wide environmental temperature swings from the heat of the day to the cold of the night and from weather conditions from day to day. Oilfield pumps provide a wide variety of service operations at the well site. Such operations may include, but are not limited to, drilling operations, fracturing operations, perforating operations, fluid loss operations, primary cementing operations, secondary or remedial cementing operations, or any combination of operations thereof.

Typically a high-pressure oilfield pump utilizes a plunger design to pressurize the fluid. These pumps may operate with multiple plungers to achieve the desired flow rate at high pressure. A typical high-pressure oilfield pump may utilize 3, 4, 5, or more plungers to produce a steady flow of high pressure fluid to a wellbore. These pumps may pump a wide variety of servicing fluids into the wellbore. Non-limiting examples of suitable wellbore servicing fluid include a fracturing fluid (e.g., a particle-laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid.

The plunger type pumps typically are constructed with a power end providing axial force to a fluid end. The fluid end utilizes a plunger to draw in fluid through a suction valve then pressurizes the fluid inside a pump chamber until the discharge valve opens to expel the fluid. A packing assembly (also referred to simply as a packing or seal) comprised of a packing sleeve and packing stack along with a packing screw provides a pressure seal for the reciprocating plunger, wherein the packing stack is comprised of a packing carrier and a packing seal.

The seals around the plunger on high-pressure oilfield pumps may erode and begin to leak fluid past the plunger. The combination of the erosive nature of the fluids, operating temperature of the pumps, the environmental temperature of the wellsite may erode the isolating ability of the packing until the packing begins to leak fluid, sand, and debris onto the packing carrier and packing screw. These pumps may be serviced at the wellsite to replace the packing assembly and return the pump to operation servicing the well. However, the replacement can be difficult to perform and causes down time for the pump. Thus, it is advantageous to minimize susceptibility to wear for the packing stack and the packing sleeve.

Disclosed herein is a packing sleeve that minimizes wear due to corrosive erosion and thus maximizing longevity of the packing sleeve. The packing sleeve extends axially toward the fluid end of the pump such that the point of corrosion assisted fatigue is moved to a lower stress surface. Additionally, or optionally, the packing sleeve has an angled edge on the fluid end of the packing sleeve which allows a more secure removal of the packing assembly.

In some embodiments, the packing sleeve has a groove or grooves on the inside and/or the outside surface which may be axially aligned. Additionally, or optionally, holes or slots may be made in the groove to allow fluid transfer. For example, a slot in the axially aligned outer and inner groove may be made to allow oil, grease, or any other lubricating substance to pass through the packing sleeve.

Turning now to FIG. 1 a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 to power a crank arm/connecting rod 20 attached to a pushrod 30 that is coupled by mechanical linkages 4 to at least one reciprocating element 18 (e.g., a plunger or piston), wherein the reciprocating element 18 has a reciprocating element diameter. Additionally, an engine (e.g., a diesel engine), motor (e.g., electric motor), or other suitable power sources may be operatively connected to the crankshaft 16 (e.g., through transmission and driveshaft) and operable to actuate rotation thereof. In operation, rotation of the crankshaft 16 induces translational movement of the crank arm/connecting rod 20, thereby causing the pushrod 30, mechanical linkage 4, and reciprocating element 18 to extend and retract along a flow path, which may generally be defined by a central axis 17 within a reciprocating element bore 24 (sometimes referred to herein for brevity as a "bore 24"). Pump 10 of FIG. 1 is typically mounted on a movable structure such as a semi-tractor trailer or skid, and the moveable structure may contain additional components, such as a motor or engine (e.g., a diesel engine or an electric motor), that provides power (e.g., mechanical motion) to the pump power end 12 (e.g., a crankcase comprising a crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

The pump fluid end 22 is integrated with the pump power end 12 via the integration section 11, such that pump power end 12 is operable to reciprocate the reciprocating element 18 within a reciprocating element bore 24 (FIGS. 1-2) of the pump fluid end 22. The reciprocating element bore 24 is at least partially defined by a cylinder wall 26. As described further hereinbelow with reference to FIG. 2, pump fluid end 22 can be a cross-bore pump fluid end 22 or, alternatively, an in-line or "concentric" bore pump fluid end. As utilized herein, cross-bore pump fluid ends can comprise "T-bore" pump fluid ends. "X-bore" (e.g., cross-shaped bore) pump fluid ends, or "Y-bore" pump fluid ends.

Figure 2:
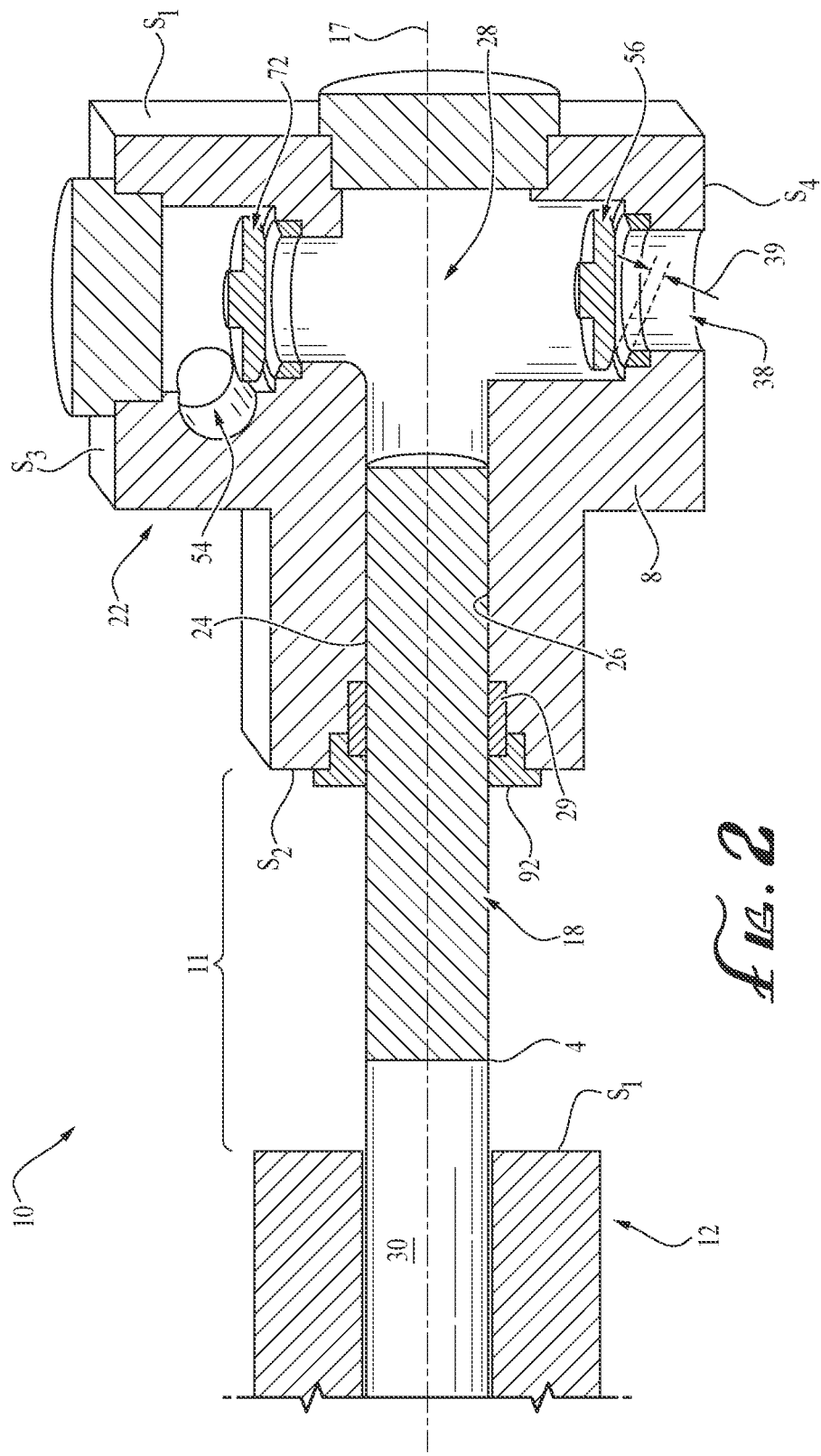
FIG. 2 is a cut-away illustration of an exemplary reciprocating pump comprising a cross-bore pump fluid end, according to embodiments of the present disclosure.

Turning now to FIG. 2, a cross-bore pump fluid end 22 is illustrated engaged with a reciprocating element 18. The pump 10 includes at least one fluid inlet 38 with a minimum valve opening 39 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like. The pump 10 is a pump in which the pump fluid end 22 that has a fluid end body 8 and comprises reciprocating assemblies, the fluid inlet 38, the discharge outlet 54, a pump chamber 28, and a reciprocating element bore 24 within which a corresponding reciprocating element 18 reciprocates during operation of the pump 10 via connection therewith to a (e.g., common) pump power end 12. Further, the fluid inlet 38 comprises a suction valve assembly 56 which has the minimum valve opening 39 and the discharge outlet 54 comprises a discharge valve assembly.

A pump 10 of this disclosure may have limited access to packing stack 29 in FIG. 2 due to the location within the integration section 11. The integration section 11 can be positioned in a space between the pump fluid end 22 and the pump power end 12, and can be safeguarded (e.g., from personnel) via a cover 15. Locations described as front S1, back S2, top S3, and bottom S4 can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to the size and positioning of pump 10, the front S1 and top S3 of the pump fluid end 22 are more easily accessible than a back S2 or bottom S4 thereof. In a similar manner, a front of pump 10 is distal the pump power end 12, and the back of the pump 10 is distal the pump fluid end 22.

Figure 3:
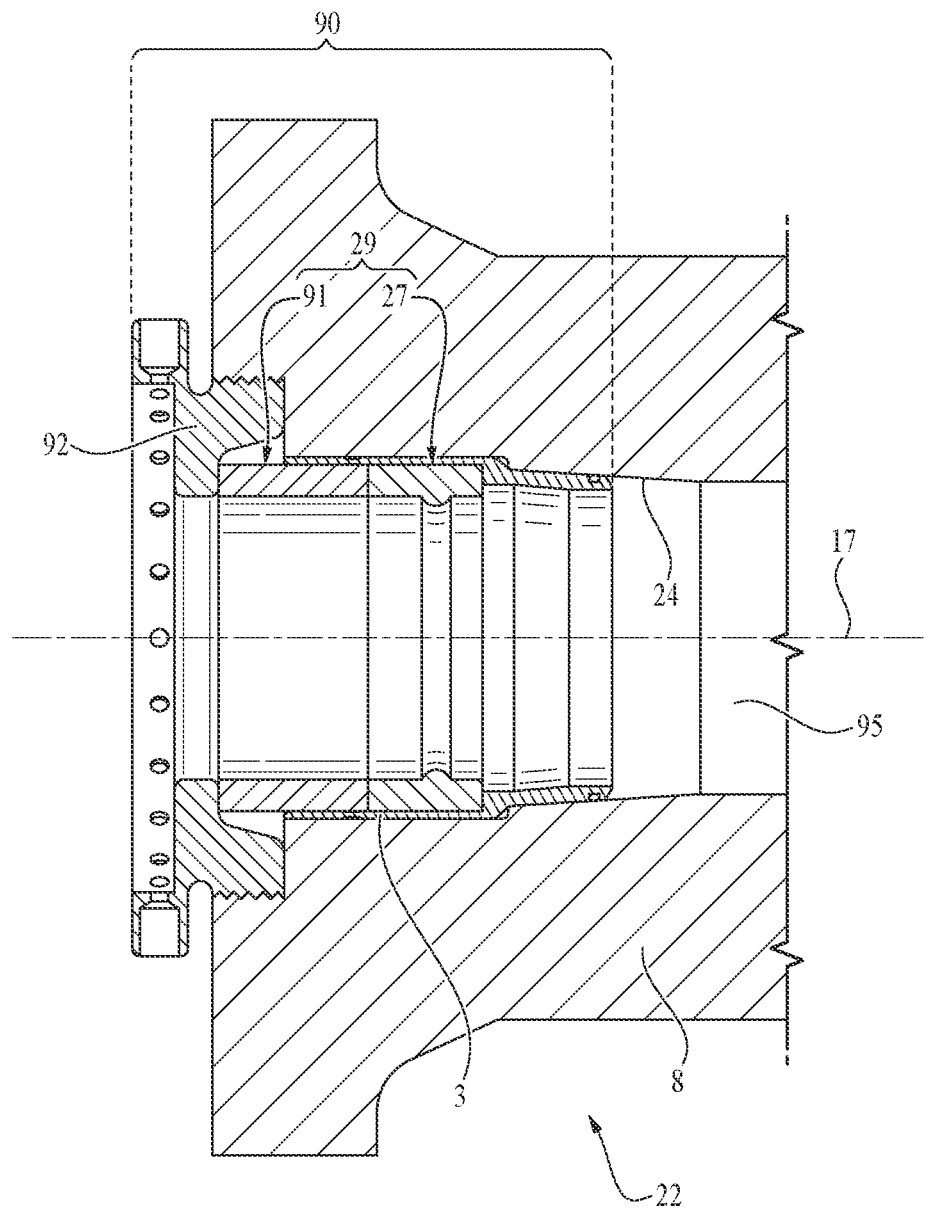
FIG. 3 is a cut-away illustration of a pump comprising a packing assembly, a fluid end body, and a packing screw of this disclosure.

FIG. 3 is a cut-away illustration of a packing assembly 90 of this disclosure in pump fluid end 22. Packing assembly 90 comprises a packing screw 92, a packing sleeve 3, and a packing stack 29 which comprises a packing seal 27 and a packing carrier 91. Packing screw 92, packing carrier 91, packing sleeve 3, and packing stack 29 are cylindrical and typically have a width measured an axial distance along a central axis that is less than the distance between the pump power end 12 and the pump fluid end 22 to allow for removal. One or more of the packing seals 27 (e.g., "o-ring" seals or the like) may be arranged around the reciprocating element 18 to provide sealing between the outer walls of the reciprocating element 18 and the cylinder walls 26 defining at least a portion of the reciprocating element bore 24. The packing seal 27 can be any suitable packing known to those of skill in the art and with the help of this disclosure. The packing seal 27 may comprise an elastomeric material, a plurality of rings of elastomeric material, may comprise one, two, three, four, or more of rings of elastomeric material. Skilled artisans will recognize that the seals may comprise any suitable type of seals, and the selection of seals may depend on various factors, e.g. fluid, temperature, pressure, etc. Located adjacent to the packing seal 27 is the packing carrier 91. The assembly of the packing seal 27 and the packing carrier 91 forms the packing stack 29. Additionally, or alternatively, the packing stack 29 may include components such as a bearing retainer, a packing adapter, a backup ring, a packing, and a header ring which may be placed adjacent to one another in any order.

Figure 4A:
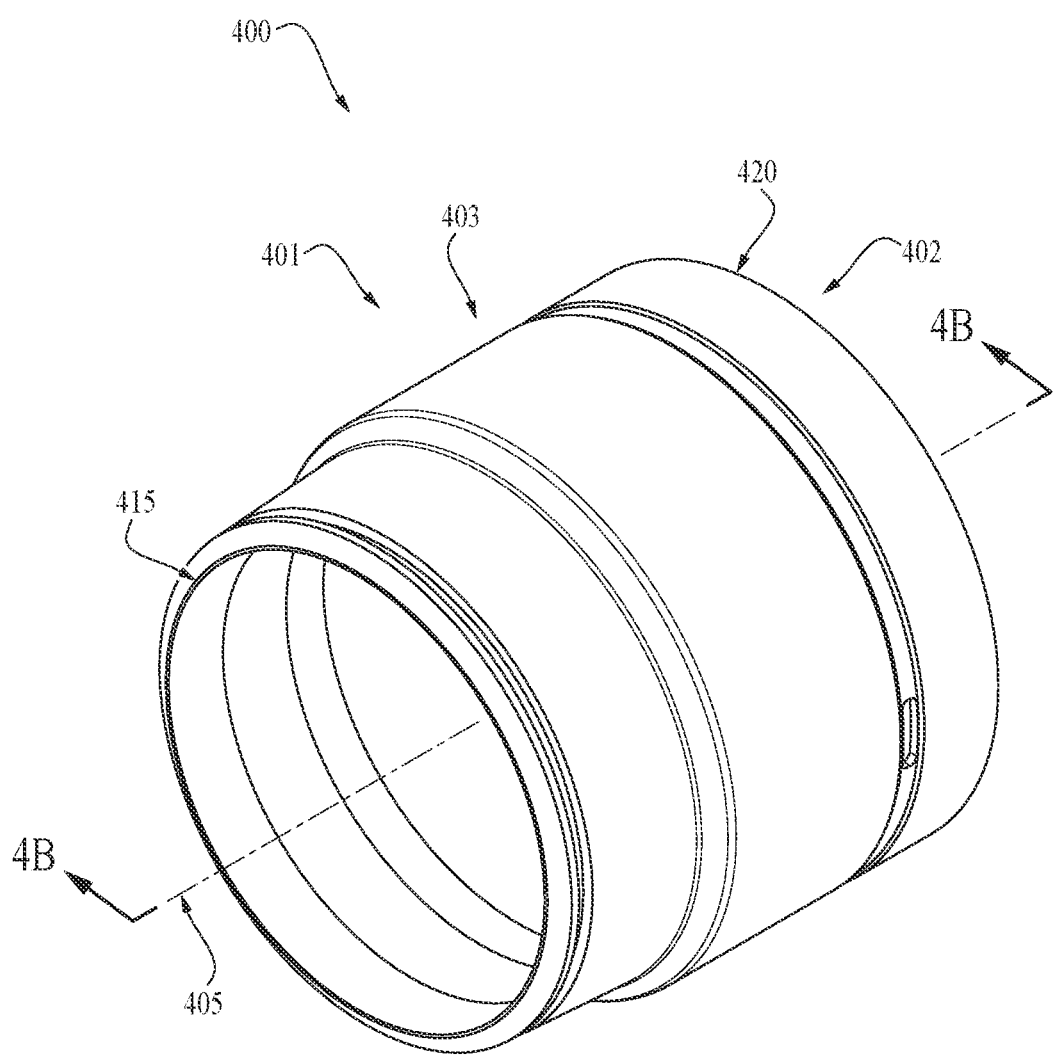
FIG. 4A is a prospective view illustration of a packing sleeve of this disclosure.
Figure 4B:
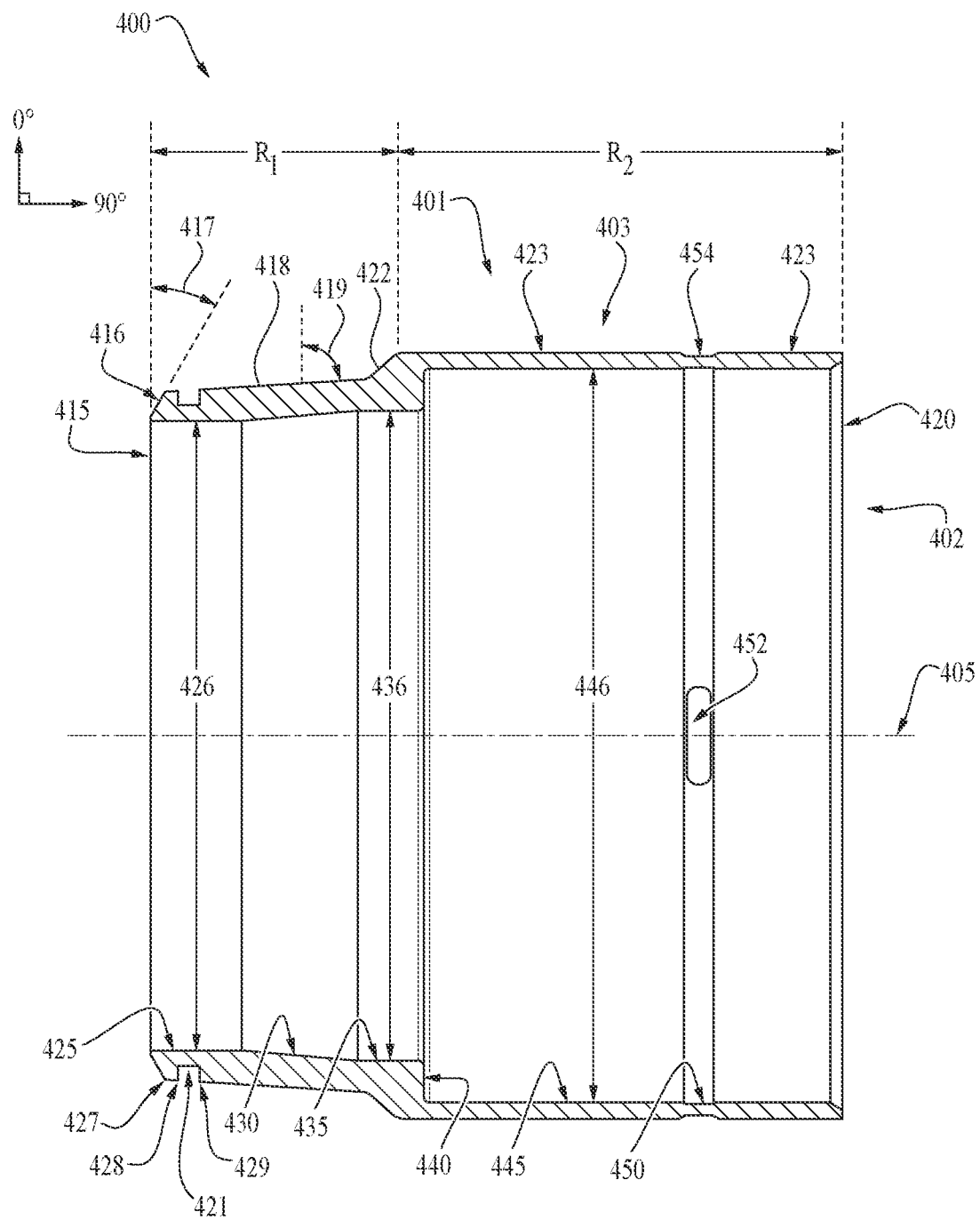
FIG. 4B is a cut-away illustration of the packing sleeve of FIG. 4A of this disclosure.

FIG. 4A illustrates perspective view of an embodiment of packing sleeve 400 (which corresponds to packing sleeve 3 discussed with reference to FIG. 3). Packing sleeve 400 has a body 401 that is generally cylindrical in shape and has an interior 402, an exterior 403, and a center axis 405 that is axially in line with (e.g., coaxial with) central axis 17 of the bore 24 when installed within fluid end 22. The packing sleeve 400 may have a first end 415 and a second end 420. FIG. 4B illustrates a cross-sectional view of packing sleeve 400. As shown in FIG. 4B, the exterior 403 has a first exterior tapered surface 416, a second exterior tapered surface 418, a first exterior transition surface 422, a first exterior cylindrical surface 423, a first exterior cylindrical groove 421, and a second exterior cylindrical groove 454. The interior 402 has a first inner cylindrical surface 425, a first inner transition surface 430, a second inner cylindrical surface 435, a second inner transition surface 440, a third inner cylindrical surface 445, and an inner groove 450.

The first exterior tapered surface 416 has a first angle 417 and is adjacent to and axially between the first end 415 and the second exterior tapered surface 418. The second exterior tapered surface 418 has a second angle 419 and is adjacent to and axially between the first exterior tapered surface 416 and the first exterior transition surface 422. A first edge 427 is formed where the first exterior tapered surface 416 and the second exterior tapered surface 418 meet. The first exterior transition surface 422 is adjacent to and axially between the second exterior tapered surface 418 and the first exterior cylindrical surface 423. The first exterior cylindrical surface 423 extends axially along the center axis 405 and is adjacent to and axially between the first exterior transition surface 422 and the second end 420. The first exterior cylindrical groove 421 is proximate the first end 415 and is axially within the second exterior tapered surface 418 such that a sealing ring may be placed in the groove 421 to form a fluid seal between the packing sleeve 400 and the fluid end body 8. The two outer edges of the first exterior cylindrical groove 421 form a second edge 428 proximate the first edge 427 and a third edge 429. The surface between edges 427 and 428 has the same taper (e.g., slope or conical profile) as surface 418. The second exterior cylindrical groove 454 is proximate the second end 420 and is axially within the first exterior cylindrical surface 423. As used herein in describing features of a packing sleeve (e.g., packing sleeve 400 and packing sleeve 500 disclosed herein in FIG. 5B), the terms axially between, axially within, or the like refer to relative location/positioning with respect to a central axis (e.g., axis 405 and axis 505 disclosed herein in FIG. 5B) of the packing sleeve being referenced.

The first inner cylindrical surface 425 extends axially along the center axis 405 with a first inner diameter 426. The first inner transition surface 430 is adjacent and axially between the first inner cylindrical surface 425 and the second inner cylindrical surface 435. The second inner cylindrical surface 435 is adjacent to and axially between the first inner transition surface 430 and the second inner transition surface 440. The second inner cylindrical surface 435 has a second inner diameter 436, wherein the second inner diameter 436 is larger than the first inner diameter 426, and wherein the second inner diameter 436 is the reciprocating element diameter 19 plus 0.2 to 0.6 inches. The second inner transition surface 440 that extends axially along the center axis 405 and is adjacent to and between the second cylindrical surface 435 and the third inner cylindrical surface 445. The third inner cylindrical surface 445 has a third inner diameter 446 and is adjacent to and between the second inner transition surface 440 and the second end 420.

The third inner diameter 446 is sized to receive the outer diameter of plunger 18, and may be for example, in a range of from 3 inches to 7 inches, alternatively 4 inches to 7 inches, alternatively 3 inches to 6 inches, alternatively 3, 3.5, 4, 4.5, 5, 5.5, 6, 6.5, or 7 inches. The inner cylindrical groove 450 is within the third inner cylindrical surface 445 and is axially in line with the second exterior cylindrical groove 454. A plurality (e.g., 2, 3, 4, 5, 6, 7, 8, etc.) of apertures 452 pass from the inner cylindrical groove 450 through the second exterior cylindrical groove 454.

Further characterizing the packing sleeve 400 described herein with reference to FIGS. 4A and 4B, the first angle 417 may be greater than 0 and equal to or less than 30 degrees, alternatively equal to or greater than 5 degrees and equal to or less than 25 degrees, alternatively equal to or greater than 10 and equal to or less than 20 degrees, or alternatively about 15 degrees. The second angle 419 may be greater than 60 and equal to or less than 89 degrees, alternatively equal to or greater than 65 degrees and equal to or less than 85 degrees, alternatively equal to or greater than 70 and equal to or less than 80 degrees, or alternatively about 75 degrees. The second inner cylindrical surface 435 may extend axially along the center axis 405 no less than 0.06 inches. The first inner diameter 426 is large enough such that particulate matter that may be suspended in the pump fluid can freely flow between the reciprocating element 18 and the first inner cylindrical surface 425; or in an aspect, the first inner diameter 426 is equal to or greater than about two times the minimum valve opening 39 plus the reciprocating element diameter 19. The second inner diameter 436 is larger than the first inner diameter 426, and wherein the second inner diameter 436 is the reciprocating element diameter 19 plus 0.2 to 0.6 inches. One or more of the following equations may also be used to characterize the packing sleeve 400:

$$V = NP \qquad \text{Eq. 1:}$$

$$A = 2V + D_p \qquad \text{Eq. 2:}$$

$$B = D_p + C_4 \qquad \text{Eq. 3:}$$

$$G_1 > G_2 \qquad \text{Eq. 4:}$$

$$E = C_1 K \qquad \text{Eq. 5:}$$

$$F = C_2 K \qquad \text{Eq. 6:}$$

$$W_A = W(C_5 + 1) + F \qquad \text{Eq. 7:}$$

wherein V is the minimum valve opening 39 and has a length dimension, N is the number of particles passing side by side between the reciprocating element 18 and the first inner cylindrical surface 425 and is dimensionless, P is the nominal particle design size and has a length dimension, A is the first inner diameter 426 and has a length dimension, B is the second inner diameter 436 and has a length dimension, $D_P$ is the reciprocating element diameter 19 and has a length dimension, $G_1$ is third inner diameter 446 and has a length dimension, $G_2$ is the diameter of the third edge 429 and has a length dimension, E is the radial distance from the inner most part of the first exterior cylindrical groove 421 to the first inner cylindrical surface 425 and has a length dimension, K is the depth of the first exterior cylindrical groove 421 and has a length dimension, F is the axial distance between the third edge 429 and the first end 415 and has a length dimension, $W_A$ is the axial distance between the first edge 427 and the edge of the first inner cylindrical surface 425 that is adjacent to the first inner transition surface 430 and has a length dimension, W is the axial distance between the second edge 428 and the third edge 429 and has a length dimension, $C_1$ is a constant that is between 0.75 and 1.25 and is dimensionless, $C_2$ is a constant that is between 1.75 and 2.25 and is dimensionless, $C_4$ is a constant within the range of 0.2 inches to 0.6 inches, and $C_5$ is a constant that is about 0.5 but must be over −0.25 and is dimensionless.

The above equations are utilized when developing design constraints for a packing sleeve 400/500 of the type disclosed herein. When pumping hydraulic, solid-laden fluid into a wellbore, many parameters should be considered to prevent unnecessary wear on pump components and to allow for optimal performance. In considering parameters of the packing sleeve 400, the baseline values of the nominal particle design size, number of particles passing side by side between the reciprocating element 18 and the first inner cylindrical surface 425, the reciprocating element diameter, the depth of the first exterior cylindrical groove 421, and the axial distance between the second edge and the third edge (e.g., the width of the first exterior cylindrical groove) should be determined before calculating remaining parameters. The nominal particle design size may have a value ranging from about 0.004 inches to about 0.093 inches and the number of particles allowed to pass side by side between reciprocating element 18 and the smallest inner surface on the packing sleeve may range from 1 to 3, alternatively from 1.5 to 3, alternatively 2 to 3, alternatively, 1, 1.5, 2, 2.5, or 3. The reciprocating element diameter may have a value ranging from 3 inches to 7 inches, alternatively 4 inches to 7 inches, alternatively 3 inches to 6 inches, alternatively 3, 3.5, 4, 4.5, 5, 5.5, 6, 6.5, or 7 inches. The depth of the first exterior cylindrical groove 421, and the axial distance between the second edge and the third edge are selected in consideration of the o-ring design which may be placed inside the first exterior cylindrical groove. The first exterior cylindrical groove depth may be between about 0.100 inches and 0.175 inches, alternatively about 0.101 inches and about 0.162 inches, alternatively about 0.120 inches and about 0.150 inches, and the axial distance between the second edge and the third edge may be between about 0.150 inches and 0.300 inchers, alternatively about 0.177 inches and 0.290 inches, alternatively about 0.190 inches and 0.250 inches.

Once the baseline parameters above are determined, the minimum valve opening 39 may be determined by using Eq. 1. The first inner diameter 426 may be determined by using the minimum valve opening 39 in conjunction with the reciprocating element diameter 19 in accordance with Eq. 2. Additionally, the second inner diameter 436 may be determined by using the reciprocating element diameter 19 and a constant disclosed herein in accordance with Eq. 3. The radial distance from the inner most part of the first exterior cylindrical groove 421 to the first inner cylindrical surface 425 may then be determined by using the depth of the first exterior cylindrical groove 421 in conjunction with a constant disclosed herein in accordance with Eq. 5. The axial distance between the third edge 429 and the first end 415 may be determined by using the depth of the first exterior cylindrical groove 421 in conjunction with a constant disclosed herein in accordance with Eq. 6. The axial distance between the first edge 427 and the edge of the first inner cylindrical surface 425 that is adjacent to the first inner transition surface 430 may be determined by using the axial distance between the second edge 428 and the third edge 429 in conjunction with both the axial distance between the third edge 429 and the first end 415 and a constant disclosed herein in accordance with Eq. 7. After all parameters are determined, the condition presented by Eq. 4 will optimally hold true.

Figure 5A:
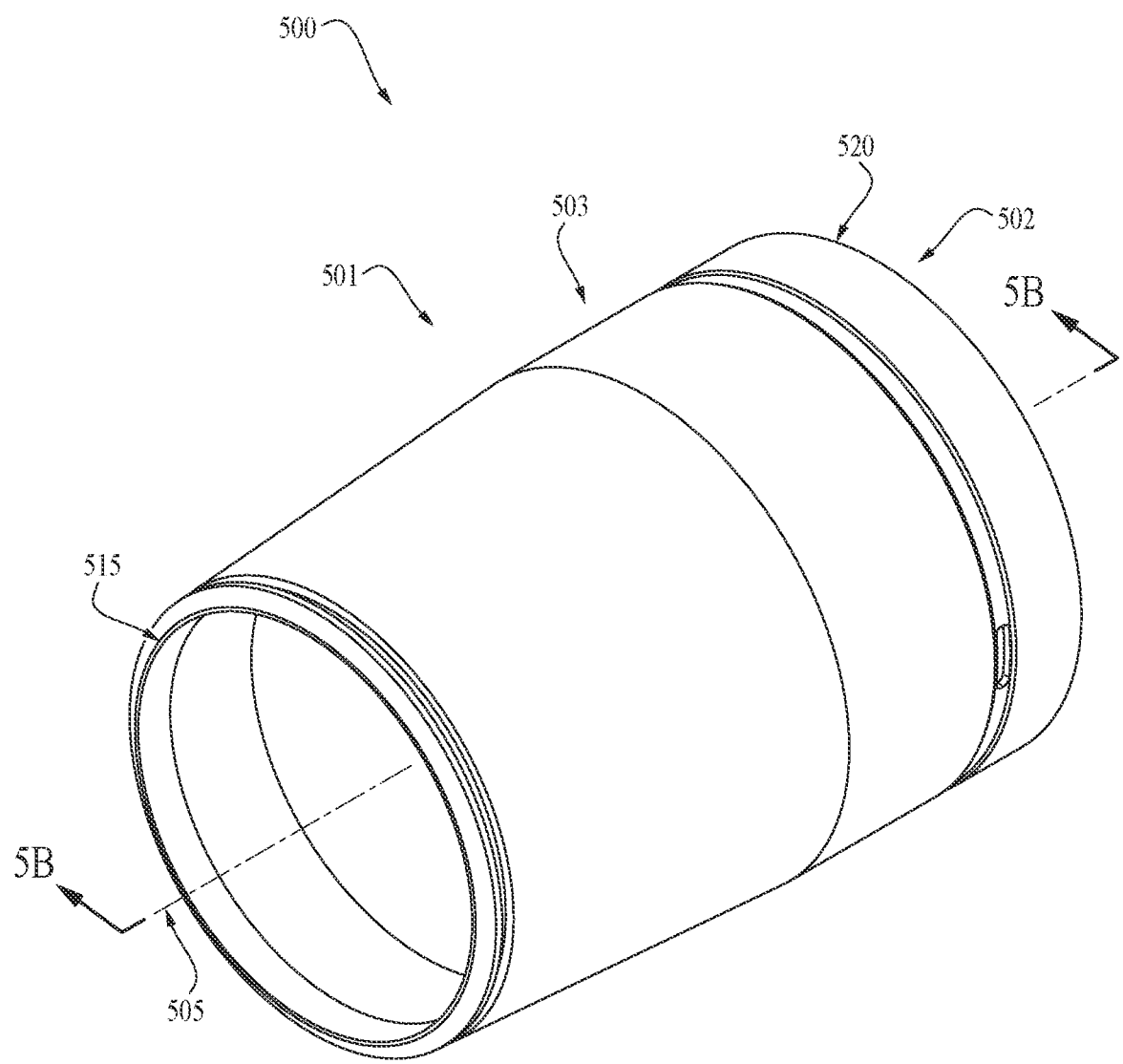
FIG. 5A is a prospective view illustration of another embodiment of a packing sleeve of this disclosure.
Figure 5B:
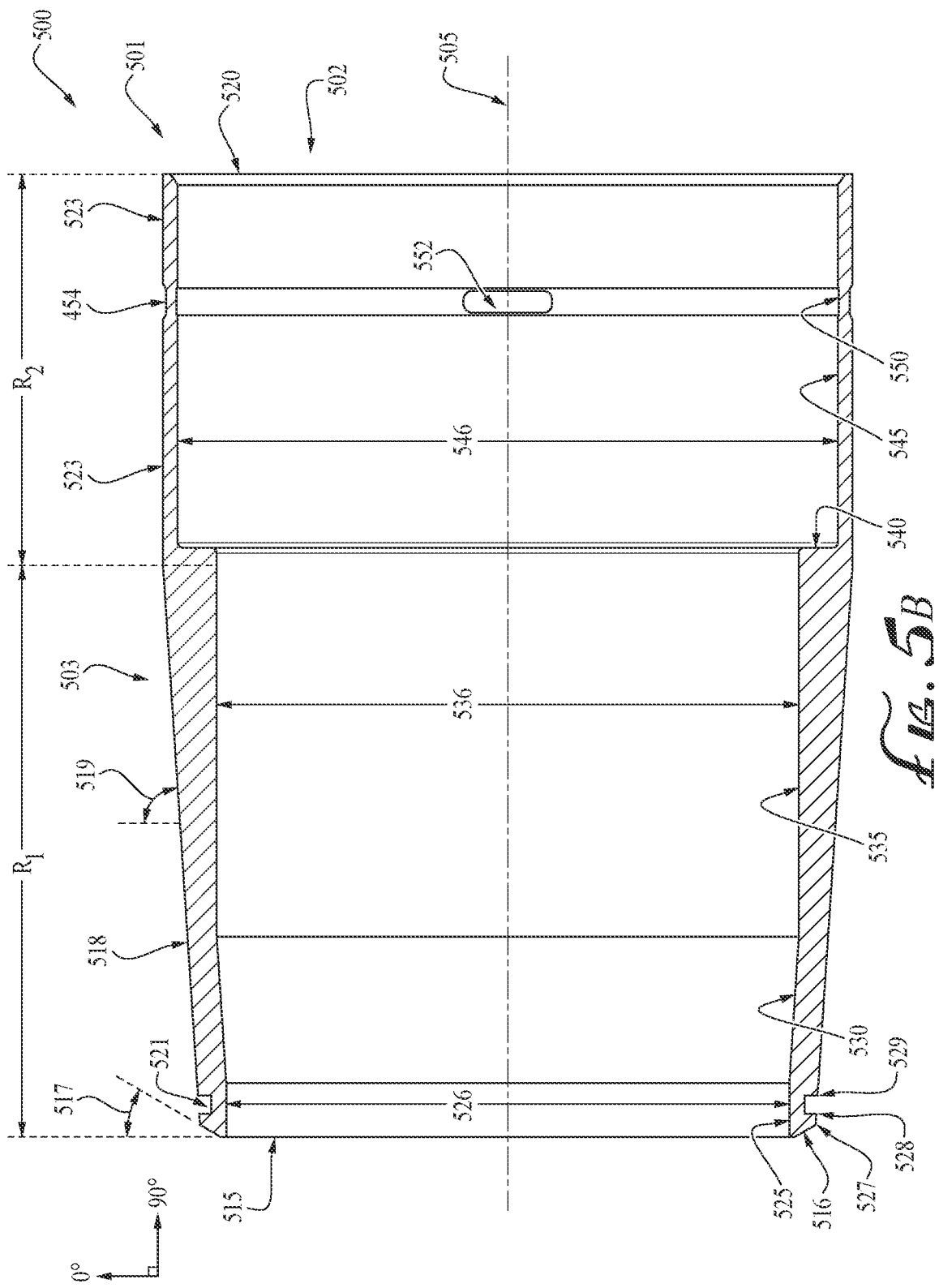
FIG. 5B is a cut-away illustration of the packing sleeve of FIG. 5A of this disclosure.

FIG. 5A illustrates perspective view of an embodiment of packing sleeve 500 (which corresponds to packing sleeve 3 discussed with reference to FIG. 3). Packing sleeve 500 has a body 501 that is generally cylindrical in shape and has an interior 502, an exterior 503, and a center axis 505 that is axially in line with (e.g., coaxial with) central axis 17 of the bore 24 when installed within fluid end 22. The packing sleeve 500 may have a first end 515 and a second end 520. FIG. 5B illustrates a cross-sectional view of packing sleeve 500. As shown in FIG. 5B, the exterior 503 has a first exterior tapered surface 516, a second exterior tapered surface 518, a first exterior cylindrical surface 523, a first exterior cylindrical groove 521, and a second exterior cylindrical groove 554. The interior 502 has a first inner cylindrical surface 525, a first inner transition surface 530, a second inner cylindrical surface 535, a second inner transition surface 540, a third inner cylindrical surface 545, and an inner groove 550.

The first exterior tapered surface 516 has a first angle 517 and is adjacent to and axially between the first end 515 and the second exterior tapered surface 518. The second exterior tapered surface 518 has a second angle 519 and is adjacent to and axially between the first exterior tapered surface 516 and the first exterior cylindrical surface 523. A first edge 527 is formed where the first exterior tapered surface 516 and the second exterior tapered surface 518 meet. The first exterior cylindrical surface 523 extends axially along the center axis 505 and is adjacent to and axially between the second exterior tapered surface 518 and the second end 520. The first exterior cylindrical groove 521 is proximate the first end 515 and is axially within the second exterior tapered surface 518 such that a sealing ring may be placed in the groove 521 to form a fluid seal between the packing sleeve 500 and the fluid end body 8. The two outer edges of the first exterior cylindrical groove 521 form a second edge 528 proximate the first edge 527 and a third edge 529. The surface between edges 527 and 528 has the same taper (e.g., slope or conical profile) as surface 518. The second exterior cylindrical groove 554 is proximate the second end 520 and is axially within the first exterior cylindrical surface 523.

The first inner cylindrical surface 525 extends axially along the center axis 505 with a first inner diameter 526. The first inner transition surface 530 is adjacent and axially between the first inner cylindrical surface 525 and the second inner cylindrical surface 535. The second inner cylindrical surface 535 is adjacent to and axially between the first inner transition surface 530 and the second inner transition surface 540. The second inner cylindrical surface 535 has a second inner diameter 536, wherein the second inner diameter 536 is larger than the first inner diameter 526, and wherein the second inner diameter 536 is the reciprocating element diameter 19 plus 0.2 to 0.6 inches. The second inner transition surface 540 that extends axially along the center axis 505 and is adjacent to and between the second cylindrical surface 535 and the third inner cylindrical surface 545. The third inner cylindrical surface 545 has a third inner diameter 546 and is adjacent to and between the second inner transition surface 540 and the second end 520. The third inner diameter 546 is sized to receive the outer diameter of plunger 18, and may be for example, in a range of from 3 inches to 7 inches, alternatively 4 inches to 7 inches, alternatively 3 inches to 6 inches, alternatively 3, 3.5, 4, 4.5, 5, 5.5, 6, 6.5, or 7 inches. The inner cylindrical groove 550 is within the third inner cylindrical surface 545 and is axially in line with the second exterior cylindrical groove 554. A plurality (e.g., 2, 3, 4, 5, 6, 7, 8, etc.) of apertures 552 pass from the inner cylindrical groove 550 through the second exterior cylindrical groove 554.

Further characterizing the packing sleeve 500 described herein above, the first angle 517 may be greater than 0 and equal to or less than 30 degrees, alternatively equal to or greater than 5 degrees and equal to or less than 25 degrees, alternatively equal to or greater than 10 and equal to or less than 20 degrees, or alternatively about 15 degrees. The second angle 519 may be greater than 60 and equal to or less than 89 degrees, alternatively equal to or greater than 65 degrees and equal to or less than 85 degrees, alternatively equal to or greater than 70 and equal to or less than 80 degrees, or alternatively about 75 degrees. The second inner cylindrical surface 535 may extend axially along the center axis 505 no less than 0.06 inches. The first inner diameter 526 is large enough such that particulate matter that may be suspended in the pump fluid can freely flow between the reciprocating element 18 and the first inner cylindrical surface 525; or about two times the minimum valve opening 39 plus the reciprocating element diameter 19. The second inner diameter 536 is larger than the first inner diameter 526, and wherein the second inner diameter 536 is the reciprocating element diameter 19 plus 0.2 to 0.6 inches.

Furthermore, the packing sleeve 500 may also be characterized by equations 1-7 disclosed herein above, wherein V is the minimum valve opening 39 and has a length dimension, N is number of particles passing side by side between the reciprocating element 18 and the first inner cylindrical surface 525 and is dimensionless, P is the nominal particle design size and has a length dimension, A is the first inner diameter 526 and has a length dimension, B is the second inner diameter 536 and has a length dimension, $D_P$ is the reciprocating element diameter 19 and has a length dimension, $G_1$ is third inner diameter 546 and has a length dimension, $G_2$ is the diameter of the third edge 529 and has a length dimension, E is the radial distance from the inner most part of the first exterior cylindrical groove 521 to the first inner cylindrical surface 525 and has a length dimension, K is the depth of the first exterior cylindrical groove 521 and has a length dimension, F is the axial distance between the third edge 529 and the first end 515 and has a length dimension, $W_A$ is the axial distance between the first edge 527 and the edge of the first inner cylindrical surface 525 that is adjacent to the first inner transition surface 530 and has a length dimension, W is the axial distance between the second edge 528 and the third edge 529 and has a length dimension, $C_1$ is a constant that is between 0.75 and 1.25 and is dimensionless, $C_2$ is a constant that is between 1.75 and 2.25 and is dimensionless. $C_4$ is a constant within the range of 0.2 inches to 0.6 inches, and $C_5$ is a constant that is about 0.5 but must be over −0.25 and is dimensionless. Further, the process of determining parameters for packing sleeve 500 may reflect that of the process disclosed herein for packing sleeve 400.

In some embodiments the packing sleeve 400/500 may comprise a tubular body having a first end, a second end, a total axial length along a center axis extending from the first end to the second end, and an exterior cylindrical surface adjacent the second end. The tubular body may further comprise a first region, R1, wherein the first region extends axially a first distance such that the first region, R1, is adjacent to both the first end and the exterior cylindrical surface. Additionally, the tubular body may further comprise a second region, R2, wherein the second region extends axially a second distance such that the second region. R2, is adjacent to both first region, R1, and the second end. With reference to sleeve 400, R1 and R2 intersect at a point where the first exterior transition surface 422 and the first exterior cylindrical surface 423 intersect, and R1 spans an axial width from the first end 415 to the intersect point and R2 spans an axial width from second end 420 to the intersect point. With reference to sleeve 500, R1 and R2 intersect at a point where the second exterior tapered surface 518 and the first exterior cylindrical surface 523 intersect, and R1 spans an axial width from the first end 515 to the intersect point and R2 spans an axial width from the second end 520 to the intersect point. The first axial distance and the second axial distance may equal the total axial length and the first axial distance may composes from about 35-70%, alternatively from about 40-65%, alternatively from about 45-65%, alternatively about 35, 40, 45, 50, 55, 60, 65, or 70% of the total axial length. Additionally, the first region may have a first inner diameter proximate the first end and the second region may have a second inner diameter proximate the second end. Furthermore, the first inner diameter may be smaller than the second inner diameter. The packing sleeve 400/500 of this embodiment may further comprise a tapered surface 416/516 proximate and adjacent to the first end (e.g., a contact surface for engagement with a removal tool configured to remove the packing sleeve from a pump fluid end), wherein the tapered surface may have an angle that is between 1 and 30 degrees.

Disclosed herein further is a method of installing packing sleeves 400/500 as described herein in a pump fluid end 22, for example as part of original equipment manufacture (OEM) or as part of maintenance, overhaul, or retrofitting services of an existing pump fluid end. For example, packing sleeve 3 as shown in FIG. 3 may be may be a packing sleeve 400/500 as originally manufactured or a conventional packing sleeve 3 may be easily interchanged or substituted with packing sleeve 400 or 500 during pump maintenance services.

A packing assembly comprising a packing sleeve 400/500 of this disclosure can be assembled in a pump fluid end 22 by a method comprising first removing a preexisting packing sleeve from the fluid end body, if any, then preparing the reciprocating element bore 24 for installation. Preparing the reciprocating element bore 24 for installation may include cleaning, lubricating, inspecting, or otherwise maintaining the reciprocating element bore 24. After preparing the reciprocating element bore 24, the method proceeds by placing an o-ring in the first exterior cylindrical groove 421/521 configured to create a fluid seal with an adjoining surface (e.g., the reciprocating element bore 24). The method proceeds, optionally, by applying a lubricating fluid to the second exterior cylindrical groove 454/554. The method proceeds by inserting the packing sleeve 400/500 into the reciprocating element bore 24 from back S2 of pump fluid end 22 such that the first end 415/515 is closer to the front S1 of the pump fluid end 22 than the second end 420/520, and such that the o-ring in the first exterior cylindrical groove creates a fluid seal with the reciprocating element bore 24. The method proceeds by inserting the packing seal 27 and the packing carrier 91 into the packing sleeve 400/500 (which is present inside the reciprocating element bore 24) from the back S2 of pump fluid end 22, and coupling the packing screw 92 into reciprocating element bore 24 from back S2 of pump fluid end 22 (e.g., via threading the threads on the outside diameter of packing screw 92 that is threaded with corresponding threads of the inside diameter of the reciprocating element bore 24). Once coupled, packing screw 92 retains packing stack 29 and packing sleeve 400/500 within reciprocating element bore 24. The method proceeds by inserting the reciprocating element 18 at least partially into the reciprocating element bore 24, wherein the reciprocating element 18 is connected to the power end 12, such that the power end can provide reciprocating axial force to the reciprocating element 18.

In some embodiments, the packing sleeve 400/500 may be installed by a method comprising inserting the packing seal 27 and packing carrier 91 (together comprising the packing stack 29) into the second end 420/520 of the packing sleeve body 400/500 (collectively, a "packing assembly"), such that the packing stack 29 is adjacent to the second inner transition surface 440/540 and is adjacent to the third inner cylindrical surface 445/545. An o-ring may be placed in the first exterior cylindrical groove 421/521 of the packing sleeve body prior to or after forming the packing assembly. The method may proceed by preparing the reciprocating element bore 24 for installation. Preparing the reciprocating element bore 24 for installation may include cleaning, lubricating, inspecting, or otherwise maintaining the reciprocating element bore 24. After preparing the reciprocating element bore 24, the method may proceed by placing an o-ring in the first exterior cylindrical groove 421/521 configured to create a fluid seal with an adjoining surface (e.g., the reciprocating element bore 24). The method may proceed by, optionally, applying a lubricating fluid to the second exterior cylindrical groove 454/554. The method may proceed by inserting the packing assembly into the reciprocating element bore 24 from back S2 of pump fluid end 22 such that the first end 415/515 is closer to the front S1 of the pump fluid end 22 than the second end 420/520, and such that the o-ring in the first exterior cylindrical groove creates a fluid seal with the reciprocating element bore 24. The method may proceed by coupling the packing screw 92 into reciprocating element bore 24 from back S2 of pump fluid end 22 (e.g., via threading the threads on the outside diameter of packing screw 92 that is threaded with corresponding threads of the inside diameter of the reciprocating element bore 24). Once coupled, packing screw 92 retains packing stack 29 and packing sleeve 400/500 within reciprocating element bore 24 (and/or within a packing sleeve 95 therein). The method proceeds by inserting the reciprocating element 18 at least partially into the reciprocating element bore 24, wherein the reciprocating element 18 is connected to the power end 12, such that the power end can provide reciprocating axial force to the reciprocating element 18.

Additionally or optionally, following installation of the packing sleeve 400/500 into pump fluid end 22, a lubricating fluid (e.g., oil or grease) may be inserted into the second exterior cylindrical groove 454/554 such that the lubricating fluid may pass through the plurality of apertures 452/552 and lie within the first inner cylindrical groove wherein it may be operable to provide lubricating properties to proximate components. For example, the lubricating fluid may be pumped in through an aperture of the fluid end body 22 which allows the lubricating fluid to pass through the fluid end body 22 and come in fluid communication with the second exterior cylindrical groove 454/554.

Further, if a packing sleeve 400/500 requires removal (or example, in order to repair or replace an existing packing sleeve 400/500 present in a pump fluid end), the removal can be carried out by a method comprising uncoupling and removing the packing screw 92. The method proceeds by inserting a removal tool which may have an angle complimentary to that of the first angle 417/517. This complimentary angle will provide a contact surface with first exterior tapered surface 416/516 such that when axial force is applied to remove the packing sleeve 400/500, the tool may slide along the first exterior tapered surface 416/516 and be forced toward the second exterior tapered surface 418/518. This will cause the removal tool to become further engaged as it is forced toward the exterior surface of the packing sleeve 400/500. Thus, the first exterior tapered surface 416/516 allows the removal tool to engage (e.g., become wedged between) the first exterior tapered surface 416/516 such that when axial force is applied to remove the packing sleeve 400/500, the removal tool will not slip off of the first end 515.

Figure 6:
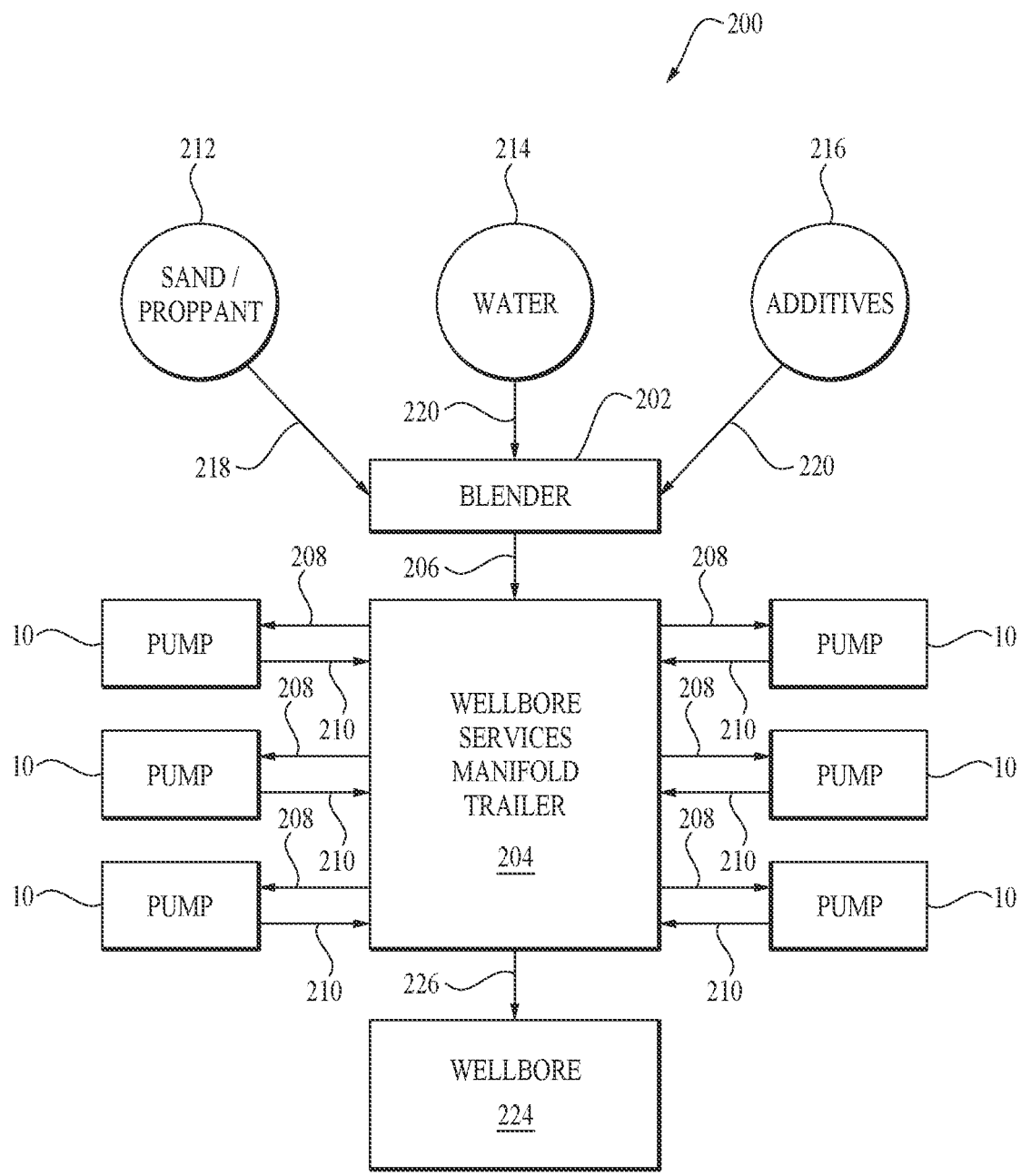
FIG. 6 is a schematic representation of an embodiment of a wellbore servicing system, according to embodiments of this disclosure.

Also disclosed herein are a method of servicing a wellbore and a wellbore servicing system 200 comprising a pump 10 having a fluid end containing a packing sleeve 400/500 of this disclosure. An embodiment of a wellbore servicing system 200 and a method of servicing a wellbore via the wellbore servicing system 200 will now be described with reference to FIG. 6, which is a schematic representation of an embodiment of a wellbore servicing system 200, according to embodiments of this disclosure.

A method of servicing a wellbore 224 according to this disclosure comprises: fluidly coupling a pump 10 to a source of a wellbore servicing fluid and to the wellbore 224; and communicating wellbore servicing fluid into a formation in fluid communication with the wellbore 224 via the pump 10. As detailed further hereinabove, the pump 10 comprises a pump fluid end 12 having a packing sleeve 400/500 of this disclosure and a pump power end 22. The pump power end 12 is operable to reciprocate reciprocating element 18 within reciprocating element bore 24 of pump fluid end 22. The pump fluid end 22 comprises: reciprocating element 18 at least partially within reciprocating element bore 24 of the pump fluid end 22, wherein the reciprocating element bore 24 extends into pump fluid end 22 from an end (e.g., back end S2) of pump fluid end 22 and has a central axis 17; a suction valve assembly 56; and a discharge valve assembly 72, a packing stack 29, and a packing sleeve 400/500 of this disclosure.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, diverter fluids, sealants, drilling fluids, completion fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, servicing a wellbore may additionally or alternatively include pumping a fluid into a wellbore that penetrates a subterranean formation by applying an axial force to the reciprocating element 18 axially along the reciprocating element bore 24 away from the pump chamber 28 such that a fluid is sucked into the pump chamber 28 though the minimum valve opening 39 of the suction valve assembly 56. Then forcing the reciprocating element 18 axially toward the pump chamber 28 to compress and expel the fluid though the discharge valve assembly 72, wherein the reciprocating element has a fluid seal formed by the packing stack. Additionally, the packing stack 29 may located at least partially within the bore of the packing sleeve 400/500 and the packing sleeve 400/500 may be located at least partially within the reciprocating element bore 24.

ADDITIONAL DISCLOSURE

The following are non-limiting, specific embodiments in accordance with the present disclosure.

A first embodiment, which is a packing sleeve for a pump fluid end comprising: a tubular body having a first end, a second end, and a total axial length along a center axis extending from the first end to the second end; wherein the tubular body further comprises a first region that is adjacent to the first end, wherein the first region extends away from the first end a first axial distance and a second region that is adjacent to the second end, wherein the second region extends away from the second end a second axial distance and abuts the first region, wherein the first axial distance and the second axial distance equal the total axial length and wherein the first axial distance comprises about 35-70% of the total axial length.

A second embodiment, which is the packing sleeve of the first embodiment, wherein: the first region has a first inner diameter proximate the first end; the second region has a second inner diameter proximate the second end; and the first inner diameter is smaller than the second inner diameter.

A third embodiment, which is the packing sleeve of the first or the second embodiment, further comprising: a tapered surface proximate and adjacent to the first end; and wherein the tapered surface has an angle that is between 1 and 30 degrees.

A fourth embodiment, which is a packing sleeve for a pump fluid end comprising: a body with a first end, a second end, a bore, an exterior surface, an interior surface, and a center axis; wherein the exterior surface comprises: a first exterior tapered surface adjacent to and axially between the first end and a second exterior tapered surface, wherein the first exterior tapered surface has a first angle; a second exterior tapered surface adjacent to and axially between the first exterior tapered surface and a first exterior cylindrical surface, wherein the second exterior tapered surface has a second angle; the first exterior cylindrical surface extending axially along the center axis with a first diameter and adjacent to and axially between the second exterior tapered surface and the second end; and a first exterior cylindrical groove with a first groove depth and a first groove width proximate the first end and axially within the second exterior tapered surface; wherein the interior surface comprises: a first inner cylindrical surface extending axially along the center axis with a first inner diameter and is adjacent to and axially between the first end and a first inner transition surface; a first inner transition surface adjacent to and axially between the first inner cylindrical surface and a second inner cylindrical surface; the second inner cylindrical surface extending axially along the center axis with a second diameter and adjacent to and axially between the first inner transition surface and a second inner transition surface; the second inner transition surface extending axially along the center axis and adjacent to and between the second cylindrical surface and a third inner cylindrical surface; and the third inner cylindrical surface extending axially along the center axis with a third diameter and adjacent to and axially between the second inner transition surface and the second end.

A fifth embodiment, which is the packing sleeve of the fourth embodiment, further comprising a first exterior transition surface that is adjacent to and axially between the second exterior tapered surface and the first exterior cylindrical surface.

A sixth embodiment, which is the packing sleeve of the fourth or the fifth embodiment, further comprising: a tapered surface proximate and adjacent to the first end; and wherein the tapered surface has an angle that is between 1 and 30 degrees.

A seventh embodiment, which is a pump, comprising: the packing sleeve of any of the first through the sixth embodiments disposed within a reciprocating element bore of a fluid end of the pump.

An eighth embodiment, which is the pump of the seventh embodiment, further comprising: a suction valve in fluid communication with the reciprocating element bore and having a minimum valve opening configured to allow a particulate matter to flow through; a discharge valve in fluid communication with the reciprocating element bore; a reciprocating element disposed within the packing sleeve and configured to reciprocate along the center axis of the packing sleeve and intake fluid through the suction valve on a suction stroke of the pump and discharge fluid through the discharge valve on a discharge stoke of the pump; a packing stack disposed within the packing sleeve, wherein the packing stack further comprises a packing carrier and a packing seal and wherein the packing seal contacts an outer surface of the reciprocating element to provide a fluid seal; and a packing screw that is adjacent to the second end of the packing sleeve body and coupled to the fluid end to secure the packing sleeve inside the fluid end.

A ninth embodiment, which is a pump comprising: a packing sleeve disposed within a reciprocating element bore of a fluid end of the pump, the packing sleeve comprising: a body with a first end, a second end, a bore, an exterior surface, an interior surface, and a center axis; wherein the exterior surface comprises: a first exterior tapered surface proximate the first end that has a first edge and a second edge, wherein the first edge is adjacent the first end; a first exterior cylindrical groove proximate the first end and axially within the second exterior tapered surface with a first groove depth, a first groove width, a leading edge and a back edge that has a back edge diameter, wherein the leading edge is closer to the first end than the back edge; and wherein the interior surface comprises: a first inner cylindrical surface extending axially along the center axis with a first inner diameter and a front side and a back side, wherein the front side is adjacent to the first end; the second inner cylindrical surface extending axially along the center axis with a second diameter and adjacent to and axially between the first inner transition surface and a second inner transition surface; a suction valve in fluid communication with the reciprocating element bore and having a minimum valve opening configured to allow a particulate matter to flow through; a discharge valve in fluid communication with the reciprocating element bore; a reciprocating element disposed within the packing sleeve and configured to reciprocate along the center axis of the packing sleeve and intake fluid through the suction valve on a suction stroke of the pump and discharge fluid through the discharge valve on a discharge stoke of the pump; a packing stack disposed within the packing sleeve, wherein the packing stack further comprises a packing carrier and a packing seal and wherein the packing seal contacts an outer surface of the reciprocating element to provide a fluid seal; and a packing screw that is adjacent to the second end of the packing sleeve body and coupled to the fluid end to secure the packing sleeve inside the fluid end.

A tenth embodiment, which is the pump of the eighth or the ninth embodiment, wherein the packing sleeve further comprises a first exterior transition surface that is adjacent to and axially between the second exterior tapered surface and the first exterior cylindrical surface.

An eleventh embodiment, which is the pump of any of the eighth through the tenth embodiments, wherein the packing sleeve further comprises: a tapered surface proximate and adjacent to the first end; and wherein the tapered surface has an angle that is between 1 and 30 degrees.

A twelfth embodiment, which is the pump of any of the eighth through the eleventh embodiments, wherein the minimum valve opening is the width of the largest fluid-laden fluid particle multiplied by the number of fluid-laden fluid particles that may be allowed to pass side by side between the first inner cylindrical surface and the reciprocating element.

A thirteenth embodiment, which is the pump of the twelfth embodiment, wherein the first inner diameter is two times the minimum valve opening plus the reciprocating element's diameter.

A fourteenth embodiment, which is the pump of the thirteenth embodiment, wherein the second inner diameter is the reciprocating element diameter plus a constant between 0.2 inches and 0.6 inches.

A fifteenth embodiment, which is the pump of the fourteenth embodiment, wherein the radial thickness of the packing sleeve body at the point of the first exterior cylindrical groove is the first groove depth multiplied by a constant between 0.75 and 1.25.

A sixteenth embodiment, which is the pump of the fifteenth embodiment, wherein the axial distance between the back edge and the first end is the first groove depth multiplied by a constant between 1.75 and 2.25.

A seventeenth embodiment, which is the pump of the sixteenth embodiment, wherein the axial distance between the back edge and the back side is equal to the axial distance between the leading edge and the back edge multiplied by a constant between 1.25 to 1.75 plus the axial distance between the back edge and first end.

An eighteenth embodiment, which is a method of servicing a pump comprising installing the packing sleeve of any of the first through sixth embodiments into a reciprocating element bore of a fluid end of the pump.

A nineteenth embodiment, which is the method of the eighteenth embodiment further comprising removing an existing packing sleeve from the reciprocating element bore of the fluid end of the pump prior to the installing.

A twentieth embodiment, which is a method of servicing a well penetrating a subterranean formation comprising pumping a fluid into the well with the pump of any of the seventh through seventeenth embodiments.

A twenty-first embodiment, which is the method of the twentieth embodiment, wherein the fluid is a fracturing fluid and wherein the pumping is conducted at a pressure sufficient to fracture a portion of the subterranean formation.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A packing sleeve for a pump fluid end comprising:
a tubular body having a first end, a second end, and a total axial length along a center axis extending from the first end to the second end; wherein the tubular body further comprises
a first region that is adjacent to the first end, wherein the first region extends away from the first end a first axial distance and
a second region that is adjacent to the second end, wherein the second region extends away from the second end a second axial distance and abuts the first region,
wherein the first region comprises:
a first exterior tapered surface adjacent to and axially between the first end and a second exterior tapered surface, wherein the first exterior tapered surface has a first angle;
the second exterior tapered surface adjacent to and axially between the first exterior tapered surface and a first exterior transition surface, wherein the second exterior tapered surface has a second angle, and
the first exterior transition surface is adjacent to and axially between the second exterior tapered surface and the second region;
wherein the second region comprises a first exterior cylindrical surface, which is disposed adjacent to the first exterior transition surface;
wherein the first axial distance and the second axial distance equal the total axial length and
wherein the first axial distance comprises 35-70% of the total axial length.

2. The packing sleeve of claim 1, wherein:
the first region has a first inner diameter proximate the first end;
the second region has a second inner diameter proximate the second end; and
the first inner diameter is smaller than the second inner diameter.

3. The packing sleeve of claim 1,
wherein the first angle is between 1 and 30 degrees.

4. A pump, comprising:
the packing sleeve of claim 1 disposed within a reciprocating element bore of a fluid end of the pump.

5. The pump of claim 4, further comprising:
a suction valve in fluid communication with the reciprocating element bore and having a minimum valve opening configured to allow a particulate matter to flow through;
a discharge valve in fluid communication with the reciprocating element bore;
a reciprocating element disposed within the packing sleeve and configured to reciprocate along the center axis of the packing sleeve and intake fluid through the suction valve on a suction stroke of the pump and discharge fluid through the discharge valve on a discharge stoke of the pump;
a packing stack disposed within the packing sleeve, wherein the packing stack further comprises a packing carrier and a packing seal and wherein the packing seal contacts an outer surface of the reciprocating element to provide a fluid seal; and
a packing screw that is adjacent to the second end of the packing sleeve body and coupled to the fluid end to secure the packing sleeve inside the fluid end.

6. A method of servicing a well penetrating a subterranean formation comprising pumping a fluid into the well with the pump of claim 4.

7. A method of servicing a pump comprising installing the packing sleeve of claim 1 into a reciprocating element bore of a fluid end of the pump.

8. The method of claim 7, further comprising removing an existing packing sleeve from the reciprocating element bore of the fluid end of the pump prior to the installing.

9. A packing sleeve for a pump fluid end comprising:
a body with a first end, a second end, a bore, an exterior surface, an interior surface, and a center axis;
wherein the exterior surface comprises:
  a first exterior tapered surface adjacent to and axially between the first end and a second exterior tapered surface, wherein the first exterior tapered surface has a first angle;
  the second exterior tapered surface adjacent to and axially between the first exterior tapered surface and a first exterior cylindrical surface, wherein the second exterior tapered surface has a second angle;
  the first exterior cylindrical surface extending axially along the center axis with a first diameter and adjacent to and axially between the second exterior tapered surface and the second end; and
  a first exterior cylindrical groove with a first groove depth and a first groove width proximate the first end and axially within the second exterior tapered surface;
wherein the interior surface comprises:
  a first inner cylindrical surface extending axially along the center axis with a first inner diameter and is adjacent to and axially between the first end and a first inner transition surface;
  the first inner transition surface adjacent to and axially between the first inner cylindrical surface and a second inner cylindrical surface;
  the second inner cylindrical surface extending axially along the center axis with a second diameter and adjacent to and axially between the first inner transition surface and a second inner transition surface;
  the second inner transition surface extending axially along the center axis and adjacent to and between the second inner cylindrical surface and a third inner cylindrical surface; and
  the third inner cylindrical surface extending axially along the center axis with a third diameter and adjacent to and axially between the second inner transition surface and the second end.

10. The packing sleeve of claim 9, further comprising a first exterior transition surface that is adjacent to and axially between the second exterior tapered surface and the first exterior cylindrical surface.

11. The packing sleeve of claim 9,
wherein the first exterior tapered surface has an angle that is between 1 and 30 degrees.

12. A pump comprising:
a packing sleeve disposed within a reciprocating element bore of a fluid end of the pump, the packing sleeve comprising:
  a body with a first end, a second end, a bore, an exterior surface, an interior surface, and a center axis;
  wherein the exterior surface comprises:
    a first exterior tapered surface proximate the first end that has a first edge and a second edge, wherein the first edge is adjacent the first end;
    a first exterior cylindrical groove proximate the first end and axially within a second exterior tapered surface with a first groove depth, a first groove width, a leading edge and a back edge that has a back edge diameter, wherein the leading edge is closer to the first end than the back edge; and
  wherein the interior surface comprises:
    a first inner cylindrical surface extending axially along the center axis with a first inner diameter and a front side and a back side, wherein the front side is adjacent to the first end;
    a second inner cylindrical surface extending axially along the center axis with a second diameter and adjacent to and axially between a first inner transition surface and a second inner transition surface;
a suction valve in fluid communication with the reciprocating element bore and having a minimum valve opening configured to allow a particulate matter to flow through;
a discharge valve in fluid communication with the reciprocating element bore;
a reciprocating element disposed within the packing sleeve and configured to reciprocate along the center axis of the packing sleeve and intake fluid through the suction valve on a suction stroke of the pump and discharge fluid through the discharge valve on a discharge stoke of the pump;
a packing stack disposed within the packing sleeve, wherein the packing stack further comprises a packing carrier and a packing seal and wherein the packing seal contacts an outer surface of the reciprocating element to provide a fluid seal; and
a packing screw that is adjacent to the second end of the packing sleeve body and coupled to the fluid end to secure the packing sleeve inside the fluid end.

13. The pump of claim 12, wherein the packing sleeve further comprises a first exterior transition surface that is adjacent to and axially between the second exterior tapered surface and a first exterior cylindrical surface.

14. The pump of claim 12, wherein the first exterior tapered surface has an angle that is between 1 and 30 degrees.

15. The pump of claim 12, wherein the minimum valve opening is the width of the largest fluid-laden fluid particle multiplied by the number of fluid-laden fluid particles that may be allowed to pass side by side between the first inner cylindrical surface and the reciprocating element.

16. The pump of claim 15, wherein the first inner diameter is two times the minimum valve opening plus the reciprocating element's diameter.

17. The pump of claim 16, wherein the second inner diameter is the reciprocating element diameter plus a constant between 0.2 inches and 0.6 inches.

18. The pump of claim 17, wherein a radial thickness of the packing sleeve body at a point of the first exterior cylindrical groove is the first groove depth multiplied by a constant between 0.75 and 1.25.

19. The pump of claim 18, wherein an axial distance between the back edge and the first end is the first groove depth multiplied by a constant between 1.75 and 2.25.

20. The pump of claim 19, wherein an axial distance between the back edge and the back side is equal to an axial distance between the leading edge and the back edge multiplied by a constant between 1.25 to 1.75 plus the axial distance between the back edge and first end.

\* \* \* \* \*